(12) United States Patent
Amari et al.

(10) Patent No.: US 6,193,538 B1
(45) Date of Patent: Feb. 27, 2001

(54) AUDIO RACK FOR A VEHICLE

(75) Inventors: Takeyuki Amari; Yoshiyuki Furuya, both of Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/366,558

(22) Filed: Aug. 4, 1999

(30) Foreign Application Priority Data

Aug. 5, 1998 (JP) .............................................. P 10-221938

(51) Int. Cl.⁷ .................................................. H01R 13/62
(52) U.S. Cl. ........................... 439/297; 439/164; 439/358; 361/814; 455/347; 369/75.1
(58) Field of Search ................................ 439/34, 77, 164, 439/165, 297, 298, 347, 358; 361/725–727, 796, 801, 802, 814; 455/347, 90; 369/75.1

(56) References Cited

U.S. PATENT DOCUMENTS

| | | | |
|---|---|---|---|
| 5,510,957 | * 4/1996 | Takagi .................................... | 361/814 |
| 5,610,376 | * 3/1997 | Takagi et al. .......................... | 455/347 |
| 5,788,532 | * 8/1998 | Takiguchi et al. .................... | 439/374 |
| 5,953,302 | * 9/1999 | Kobayashi .......................... | 369/75.1 |

* cited by examiner

Primary Examiner—Khiem Nguyen
(74) Attorney, Agent, or Firm—Finnegan, Henderson, Farabow, Garrett & Dunner, L.L.P.

(57) ABSTRACT

An audio rack for a vehicle has a rack case, a receiving connector, an operating panel, a linking mechanism, a controller, and a flexible flat cable. The rack case has an opening for the insertion of one of a plurality of types of electrical equipment. The receiving connector is mounted in a fixed manner to within the rack case. By the action of inserting a piece of electrical equipment into the rack case, an electrical connection is made between the electrical equipment and the receiving connector. The operating panel has a shape that is suitable for covering the opening of the rack case, and has switches that correspond to the various types of electrical equipment. The linking mechanism permits movement of the operating panel between a first and a second position. When at the first position, the operating panel covers the opening, and when at the second position, the operating panel is removed from the front of the opening, so as to permit access thereto. The controller is fixed with respect to the rack case and, for the purpose of controlling the pieces of electrical equipment, is electrically connected to the receiving connector. The cable makes a connection between the electrical equipment and the controller, and permits movement of the operating panel.

8 Claims, 5 Drawing Sheets

AUDIO RACK FOR A VEHICLE

BACKGROUND OF THE INVENTION

1. Field of the Invention

The present invention relates to audio rack for a vehicle, into which is installed one piece of electrical equipment selected from a plurality of pieces of electrical equipment.

2. Description of the Related Art

In art related to the present invention, a piece of audio equipment is installed in a center cluster module at the front part of a vehicle.

SUMMARY OF THE INVENTION

However, when replacing one piece of electrical equipment with another, it is necessary to remove fasteners such as screws, using a screwdriver or the like, and to temporarily remove power cables and signal cables and then reconnect them, this involving the re-tightening of the removed fasteners, making the equipment replacement task both complex and time-consuming.

Accordingly, it is an object of the present invention to provide an audio rack for a vehicle, which enables easy replacement of electrical equipment, and which also prevents the occurrence of connection problems.

To achieve the above-noted object, an audio rack according to the present invention has a rack case, a receiving connector, an operating unit, a linking mechanism, a controller, and a flexible flat cable. The rack case has an opening into which is inserted one piece of electrical equipment, which is selected from a plurality of pieces of electrical equipment. The receiving connector is fixed within the rack case. The operating unit has a shape that is suited to covering the opening, and has switches that correspond to the various pieces of electrical equipment. The linking mechanism links the operating unit and the rack case, and permits the operating unit to be moved between a first position and a second position. When at the first position the operating panel covers the opening, and when at the second position the operating unit is removed from the opening, thereby allowing access thereto. The controller is fixed with respect to the rack case, and is electrically connected to the receiving connector, so as to enable control of the pieces of electrical equipment that can be individually inserted into the rack case. The cable makes a connection between the operating unit and the controller, and permits the movement of the operating unit.

In the present invention, it is possible for the operating unit in the second position to adjacent to the opening.

According to the above-noted arrangement, in the condition in which a piece of electrical equipment is installed into the rack case, the opening of the rack case is covered by the operating unit in the first position. When one of the switches of the operating unit is operated, an operating signal is input to the controller via the cable, so that the controller controls the piece of electrical equipment corresponding to the operating signal.

When the piece of electrical equipment currently installed in the rack case is to be replaced by a different piece of equipment, the operating unit is moved to the second position, so as to provide access to the opening. Next, the electrical equipment within the rack case is pulled out, and a different piece of electrical equipment is inserted in its place. By pulling the electrical equipment out from within the rack case, the electrical connection between the electrical equipment and the receiving connector is released, and by inserting a piece of electrical equipment into the rack case, an electrical connection is established between the electrical equipment and the receiving connector. Finally, the operating unit is moved to the first position. In essence, when replacing a piece of electrical equipment in the present invention, the making and breaking of the electrical connection is achieved automatically by the action of removing and inserting the equipment. There is, therefore, absolutely no need to remove fasteners such as screws using a fixtures or tools, or to perform any task to achieve an electrical connection, thereby facilitating the replacement of the electrical equipment. In addition to this advantage, the occurrence of a faulty electrical connection is prevented.

In the present invention, the linking mechanism has a first linking rod and a second linking rod, in which case one end of the first linking rod is rotatably linked to the rack case by a first pin, one end of the second linking rod is rotatably linked to the other end of the first linking rod by a second pin, and the other end of the second linking rod is rotatably linked to the operating unit by a third pin.

The above-described configuration provides a linking mechanism of simple construction.

In the present invention, it is possible for the audio rack to further have an operating unit locking mechanism whereby the operating unit at the first position is releasably locked into the rack case.

According to the above-noted configuration, the operating unit is held at the first position by means of the operating unit locking mechanism.

The operating unit locking mechanism can include a mating part that is provided in the rack case, and a resilient arm, which extends from the operating unit. The resilient arm has a first protrusion, which can freely mate with the mating part of the operating unit locking mechanism. When the operating unit is at the first position, the first protrusion mates with this mating part, thereby preventing movement of the operating unit.

According to the above-noted configuration, when the operating unit is at the first position, by the mating of the first protrusion with the mating part, movement of the operating unit is prevented, and by resilient deformation of the resilient arm the mating of the first protrusion and the mating part is released, thereby allowing the operating unit to be moved from the first position.

The operating unit locking mechanism can further include a through hole that is formed in the operating unit, in which case the resilient arm can further have a second protrusion, which releasably mates with the through hole. When the operating unit is at the first and second positions, the second protrusion is positioned in the through hole.

According to the above-noted configuration, when the operating unit is at the first position, the first protrusion mates with the mating part and the second protrusion is positioned in the through hole. By pressing the second protrusion in the through hole, the resilient arm can be easily resiliently deformed, so that the mating of the first protrusion with the mating part is released, thereby allowing the operating unit to be moved from the first position.

The audio rack of the present invention can also have an equipment locking mechanism that releasably locks a piece of equipment into the rack case when the equipment is inserted thereinto.

According to the above-noted configuration, the action of the equipment locking mechanism is to prevent looseness of a piece of equipment within the rack case.

The above-noted equipment locking mechanism can further include a pressure-operated member that is pressed, and a rotating member that is substantially C-shaped. The pressure member is slidably supported so that it can move between the unlocked position and the locked position of the rack case. The rotating member is rotatably supported by the rack case. One end of the rotating member rotatably linked to the pressure member. In the condition in which a piece of electrical equipment is inserted into the rack case, when the pressure member is pressed, so as to move from the unlocked position to the locked position, the rotating member rotates, so that the other end of the rotating member mates with a mating part on the electrical equipment. With this other end of the rotating member mated to the mating part, if the equipment is pulled out of the rack case, the mating part presses the other end of the rotating member, causing the rotating member to rotate, so that the other end of the rotating member is released from the mating part, the pressure member moving to the unlocked position.

According to the above-noted configuration, pressure on the pressure member locks the electrical equipment, and when the equipment is pulled out the lock is released, thereby providing an equipment locking mechanism that is easy to operate.

DESCRIPTION OF THE PREFERRED EMBODIMENTS

Preferred embodiments of the present invention are described in detail below, with reference to relevant accompanying drawings.

Figure 6:
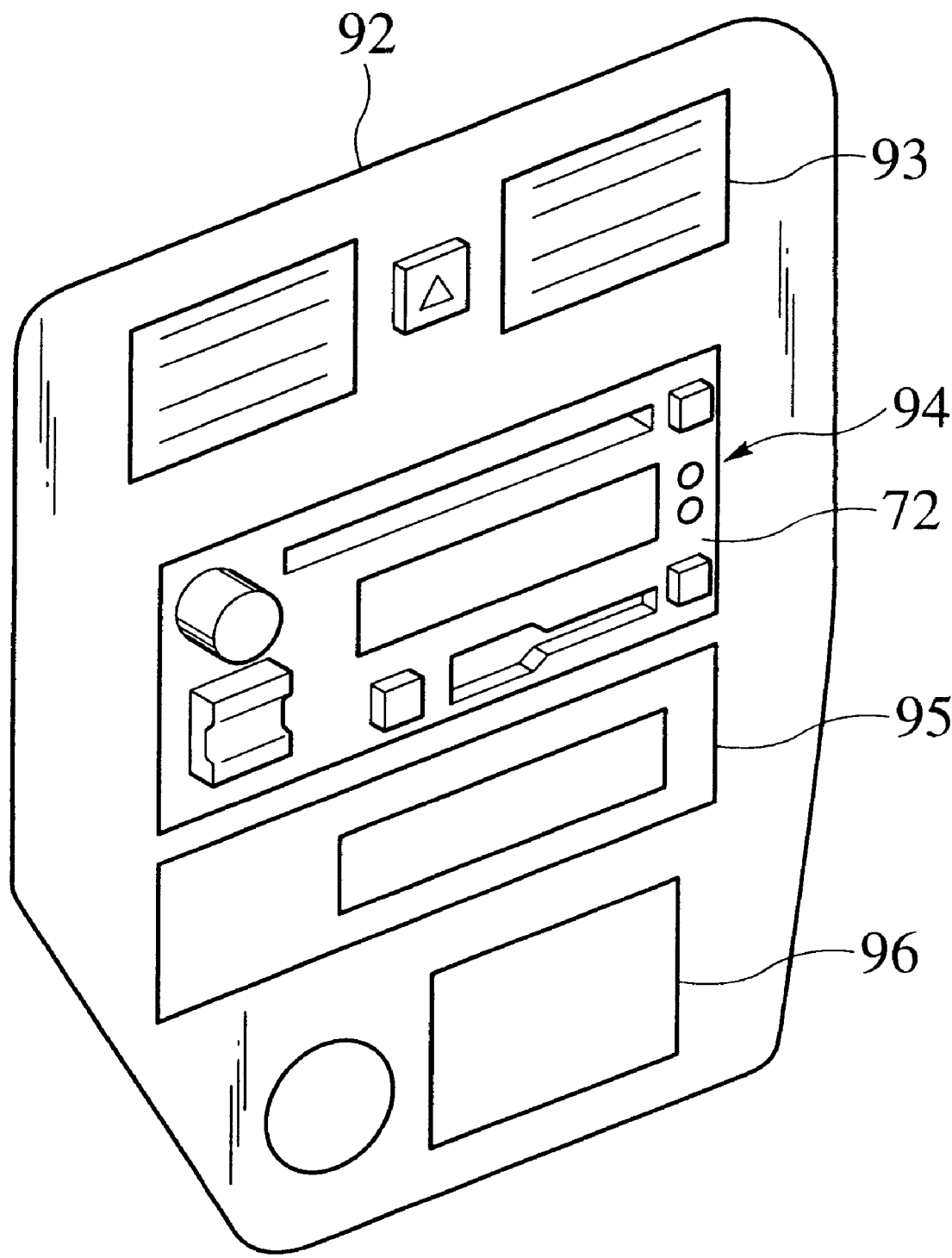
FIG. 6 is a perspective view of a bezel.

As shown in FIG. 6, a duct 93, an audio equipment unit 94, an airconditioner 95, and an ashtray 96 are built into a bezel 92 inside a vehicle.

Figure 1:
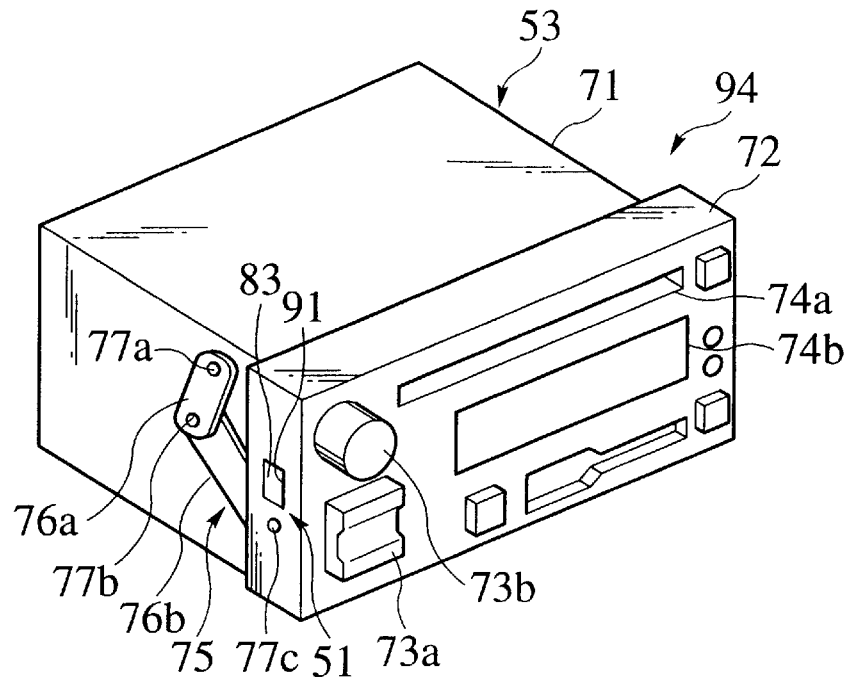
FIG. 1 is an outer perspective view that shows an audio rack of the present invention in the condition in which the operating unit is in the first position, in which the opening is blocked.
Figure 2:
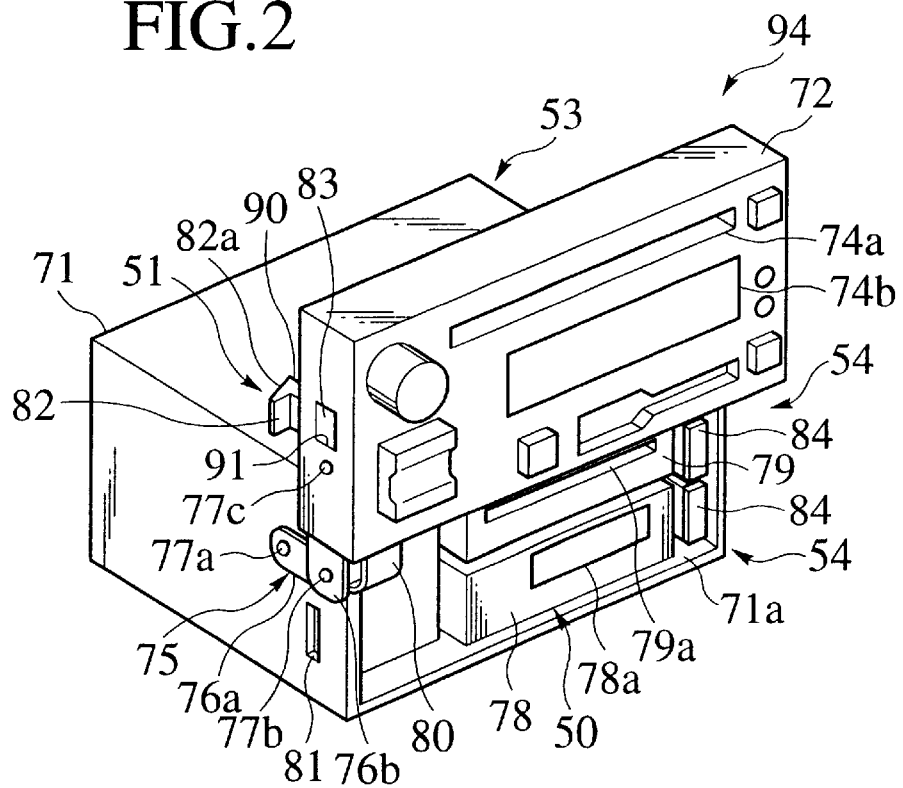
FIG. 2 is a perspective view that shows an audio rack of the present invention in the condition in which the operating unit is in the second position, in which the opening is open.
Figure 3:
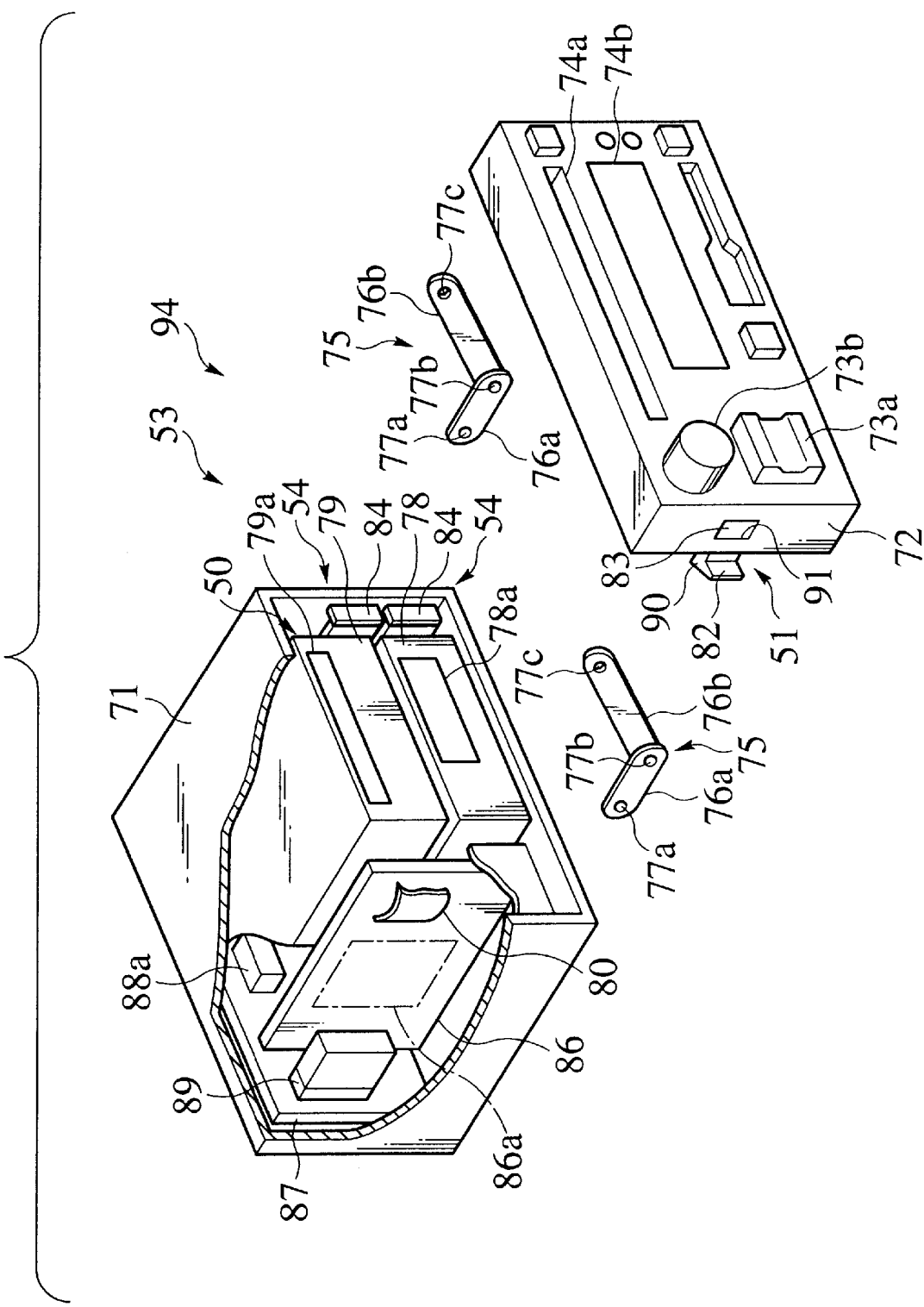
FIG. 3 is an exploded perspective view the audio rack.

As shown in FIG. 1 through FIG. 3, the audio equipment unit 94 is made up of a piece of electrical equipment, selected from a plurality of types, such as a cassette tape drive 78 and a CD drive 79, and an audio rack 53, into which the electrical equipment is installed.

The audio rack 53 has a rack case 71, a receiving connector 88, an operating panel (operating unit) 72, a linking mechanism 75, a control circuit (controller) 86a, and a flexible flat cable 80.

The rack case 71 is fixed to the body of the vehicle, and inside this rack case 71 are two storage locations, an upper and a lower storage locations that are delineated. A piece of electrical equipment 50 can be installed into each of these storage locations. The rack case 71 has an opening 71a, for insertion of the electrical equipment 50.

The operating panel 72 has a plurality of switches 73a, 73b, and media insertion ports 74a, 74b, for insertion of media such as cassettes and CDs. The operating panel 72 is of dimensions and shape that is suitable for covering the opening 71a of the rack case 71.

The linking mechanism 75 makes a joint between the rack case 71 and the operating panel 72. By means of this linking mechanism, the operating panel 72 can be moved between a first position (shown in FIG. 1) at which the opening 71a is covered and a second position (shown in FIG. 2) at which opening 71a is opened up.

The linking mechanism 75 has a first linking rod 76a, and first, second, and third pins 77a, 77b, and 77c. The first pin 77a rotatably links one end of the first linking rod 76a to the rack case 71. The second pin 77b rotatably links the other end of the first linking rod 76a and one end of the second linking rod 76b. The third pin 77c rotatably links the other end of the second linking rod 76b and the operating panel 72. The linking mechanism 75 is located in two positions, which correspond to both sides of the rack case 71.

The cassette drive 78 and the CD drive 79 each have media insertions port 78a and 79a, respectively. In the condition in which the cassette drive 78 and CD drive 79 are inserted into the rack case 71 and the operating panel 72 is set at first position, the media insertion ports 74a and 74b of the operating panel 72 are positioned over the media insertion ports 78a and 79a, respectively.

As shown in FIG. 3, a main board 86 and a bus board 87 are fixed within the rack case 71.

The main board 86 includes a control circuit 86a for the purpose of controlling the installed electrical equipment 50, and is positioned to the side of the installed electrical equipment 50.

The bus board 87 has a receiving connector 88a, and is located at the extreme rear part of the rack case 71 as seen from the front thereof. The receiving connector 88a makes a mechanical and an electrical connection with a connector 88b (shown in FIG. 7) that exists on the rear surface of the electrical equipment 50 when the electrical equipment 50 is inserted. Connectors 88a, which conform to one and the same specifications, are mounted in a fixed manner in the upper and lower storage locations within the rack case 71, and each piece of electrical equipment 50 (such as the cassette drive 78 and CD drive 79) has a connector 88b that can mate with a connector 88a. The position of the receiving connector 88a in each of the storage locations is established to be approximately the same. For this reason, regardless of whether the electrical equipment 50 is inserted into the upper or lower storage location, the connectors 88a and 88b make a connection. The main board 86 and the bus board 87 are connected by means of a connector 89.

The flat cable 80 makes an electrical connection between the operating panel 72 and the main board 86 within the rack case 71, and is of a length and flexibility that permit the operating panel 72 to move between the first position and the second position.

When the switches 73a and 73b on the operating panel 72 are operated, an operation signal is input, via the flat cable 80, from to the control circuit 86a on the main board 86. Upon receiving the signal from the switch 73a or 73b, the control circuit 86a performs control of the corresponding electrical equipment 50, via the connector 89, the bus board 87, and the connectors 88a and 88b.

An operating panel locking mechanism (operating unit locking mechanism) 51 is provided between the rack case 71 and the operating panel 72, this mechanism releasably locking the operating panel 72 at the first position.

The operating panel locking mechanism 51 has a locking hole (mating part) 81, a resilient arm 90, a tongue (first protrusion) 82, a releasing protrusion (second protrusion) 83, and a through hole 91.

The locking hole 81 and the through hole 91 pass completely through both side walls of the rack case 71. The resilient arm 90 extends from the rear surface of the operating panel 72. The tongue 82 extends from an end of the resilient arm 90, and mates with the locking hole 81 when the operating panel 72 is in the first position. The releasing protrusion 83 protrudes from the center part of the resilient arm 90 in the same direction as the tongue 82.

When the operating panel 72 is in the second position (shown in FIG. 2), the resilient arm 90 is in the initial condition, in which it is substantially in a straight line, the releasing protrusion 83 is completed inserted within the through hole 91, and the tongue 82 is exposed.

Figure 4:
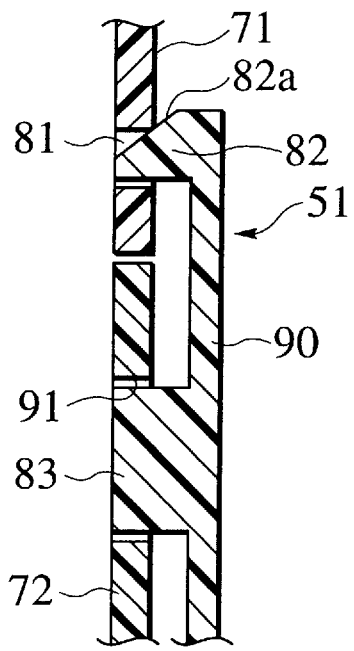
FIG. 4 is a cross-section view that shows the operating unit locking mechanism in the locked condition.

When the operating panel 72 is moved from the second position to the first position (shown in FIG. 1), the inclined surface 82a of the tongue 82 comes into contact with the inner surface of the side wall of the rack case 71 and is pressed thereby, so that the resilient arm 90 is resiliently deformed from its initial condition. Because of the deformation of the resilient arm 90, movement of the resilient arm 90 within the case is permitted, and the releasing protrusion 83 moves in a direction that removes it from the through hole 91. As shown in FIG. 4, when the operating panel 72 reaches the first position, the resilient arm 90 returns to the initial condition, the tongue 82 mating with the locking hole 81 and the releasing protrusion 83 being fully inserted into the through hole 91. By the mating of the tongue 82 with the locking hole 81, the operating panel 72 is held at the first position.

Figure 5:
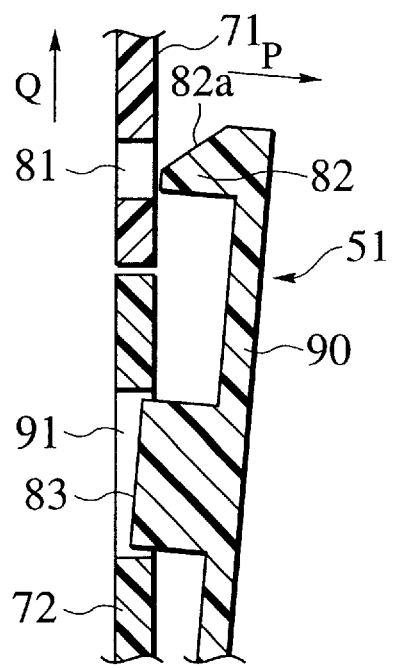
FIG. 5 is a cross-section view that shows the operating unit locking mechanism in the released condition.

When the operating panel 72 is to be moved from the first position, the releasing protrusion 83 in the through hole 91 is first pressed. By doing this, as shown in FIG. 5, the resilient arm 90 undergoes resilient deformation, the locking tongue 82 being thereby removed from the locking hole 81, this action placing the operating panel 72 in a condition which permits its free movement.

Figure 7:
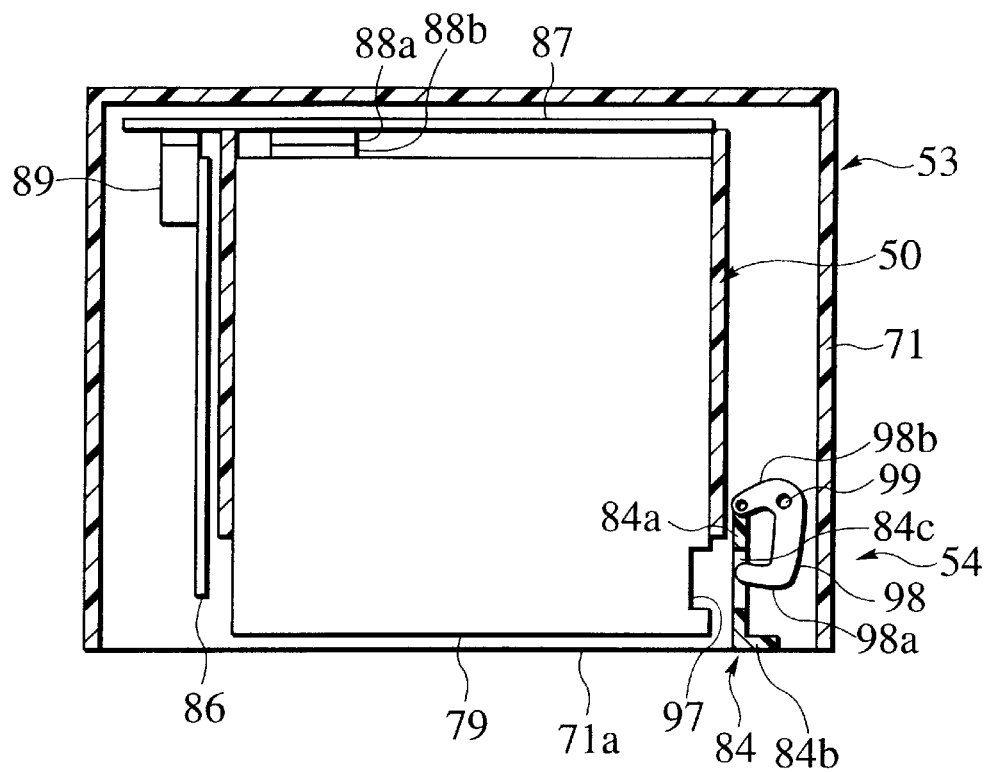
FIG. 7 is a cross-section view that shows the equipment locking mechanism in the unlocked condition.

The audio rack 53 has an equipment locking mechanism 54 for the purpose of releasably locking a piece of installed electrical equipment 50. One such equipment locking mechanism 54 is provided in each of the upper and lower storage locations. As shown in FIG. 7, the equipment locking mechanism 54 has a pressure-operated member 84 and a rotating member 98, which is substantially C-shaped.

The pressure-operated member 84 is slidably supported by the rack case 71, and can move between an unlocked position and a locked position. The pressure-operated member 84 has a plate 84a, which is position along the insertion direction of the electrical equipment 50 into the rack case 71, an operating button 84b, which faces the opening 71a positioned at one end of the plate 84a, and a hole 84c, which is formed so as to pass completely through the center part of the plate 84a.

The center part of the rotating member 98 is rotatably supported in the rack case 71. One end 98a of the rotating member 98 is rotatably linked to the other end of the plate 84a.

Figure 8:
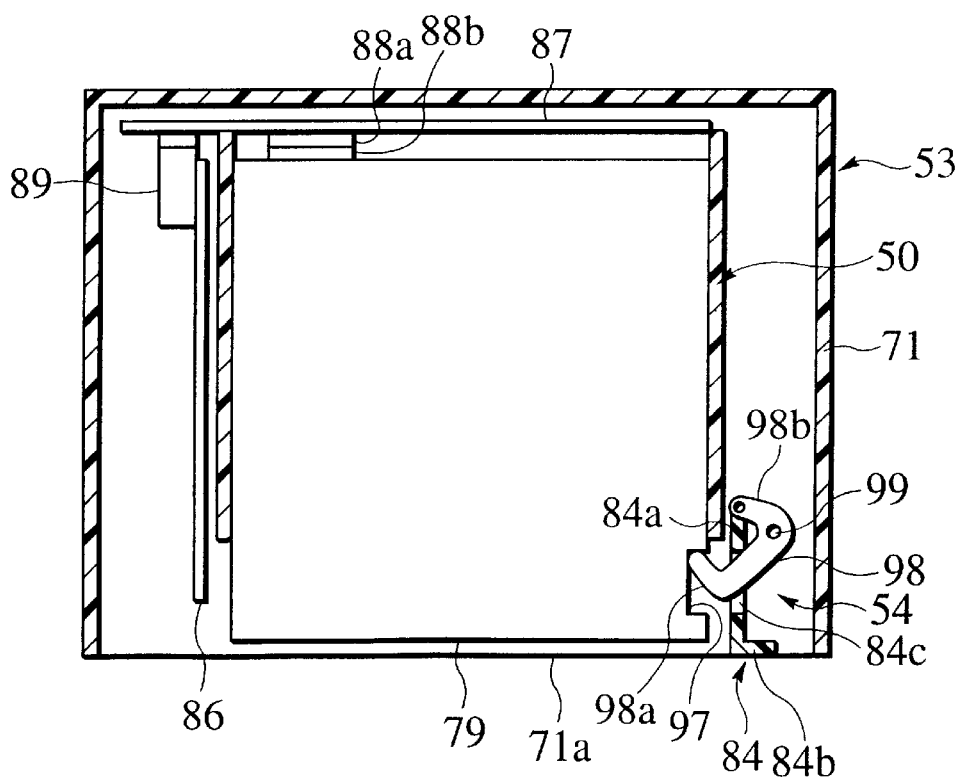
FIG. 8 is a cross-section view that shows the equipment locking mechanism in the locked condition.

In a condition in which a piece of electrical equipment 50 (CD drive 79) is inserted into the rack case 71, so that the connectors 88a and 88b are mutually mated, the operating button 84b is pressed toward the inside of the opening 71a, so that, as shown in FIG. 8, with movement toward the locked position of the pressure-operated member 84, the rotating member 98 rotates, the other end 98a of the rotating member 98 passing completely through the hole 84c and mating with a groove (mating part) 97 of electrical equipment 50. By the mating of the rotating member 98 with the groove 97, the equipment locking mechanism 54 is placed in the locked condition, thereby holding the electrical equipment 50 within the rack case 71.

In the condition in which the end 98a of the rotating member 98 is mated with the groove 87, if the electrical equipment 50 is pulled out of the rack case 71, the groove 97 presses the end 98a of the rotating member 98 so as to rotate the rotating member 98, thereby causing release of the end 98a from the groove 97 so as to move the pressure-operated member 84 to the unlocked position. By doing this, the equipment locking mechanism 54 is placed in the unlocked position.

The method of replacing a piece of electrical equipment 50 within the rack case 71 with another piece of electrical equipment 50 is described below.

The first step is to remove the bezel 92.

The second step is to press the releasing protrusion 83, so as to release the lock of the operating panel locking mechanism 51.

The third step is to pull the operating panel 72 in the first position, while pressing the releasing protrusion 83. By doing this, the first and second linking rods 76a and 76b go into a substantially straight condition, and the operating panel 72 moves to the front surface of the opening 71a. Next, the operating panel 72 is pushed upward. By doing this, the second linking rod 76b moves upward along with the moving of the operating panel 72, and the first linking rod 76a and second linking rod 76b cross at substantially a right angle, with the operating panel 72 reaching the second position, released in a perpendicular direction from the front of the opening 71a.

The fourth step is to pull out the electrical equipment 50 from the rack case 71. By pulling out the electrical equipment 50, the equipment locking mechanism 54 is placed in the unlocked condition.

The fifth step is to insert the other electrical equipment 50 into the now free storage location of the rack case 71. When the electrical equipment 50 is completely inserted, the connectors 88a and 88b are connector to one another.

The sixth step is to press the operating button 84b, thereby placing the equipment locking mechanism 54 in the locked condition. By doing this, the electrical equipment 50 is held in the prescribed position within the rack case 71.

Finally, the operating panel 72 is returned to the second position, thereby placing the operating panel locking mechanism 51 into the locked condition, in which the operating panel 72 is held in the first position.

According to an audio rack configured as described above, when replacing a piece of electrical equipment 50 with another piece of electrical equipment 50, it is possible to remove the operating panel 72 from the front surface of the opening 71a of the rack case 71, without the need for fixtures or tools such as a screwdriver to remove fasteners such as screws. Additionally, the electrical connection between the electrical equipment 50 and control circuit 86a is automatically made and broken by the action of inserting and removing the electrical equipment 50 into and from the rack case 71, thereby eliminating the need for complex electrical connection operations. The present invention therefore makes it easy for the operator of a vehicle, for example, to replace the electrical equipment 50.

The achievement of the above-noted effects not only lightens the burden placed on the user, but also prevents the occurrence of problems such as faulty connections occurring when the electrical equipment is replaced.

Furthermore, it will be understood that the present invention is not restricted to an audio rack for a vehicle that was presented as just one embodiment, nor is the electrical equipment 50 limited to the types of equipment noted in the description of the embodiment of the present invention, which can be applied to other types of electrical equipment as well. Additionally, it will be obvious that numerous variations of embodiments of the present invention are possible within the technical scope thereof.

What is claimed is:

1. An audio rack for a vehicle, into which a piece of electrical equipment selected from a plurality of types of electrical equipment can be installed, said audio rack comprising:
   - a rack case in which is formed an opening for the insertion of a piece of electrical equipment selected from the plurality of types of electrical equipment;
   - a receiving connector, which is fixed within the rack case, and which makes electrical connection with the piece of electrical equipment when the electrical equipment is inserted into the rack case;
   - an operating unit suitable for covering the opening of the rack case, this operating unit having switches that correspond to the various pieces of electrical equipment;
   - a linking mechanism between the operating unit and the rack case, which permits movement of the operating unit between a first position and a second position, the first position being a position at which the operating unit covers the opening of the rack case, and the second position being one at which the operating unit is removed from the opening so as to open it;
   - a controller for the purpose of controlling the pieces of electrical equipment, said controller being fixed in relation to the rack case and in electrical connection with the receiving connector; and
   - a flexible cable that makes a connection between the operating unit and the controller, said cable permitting movement of the operating unit.

2. An audio rack according to claim 1, wherein the operating unit at the second position is adjacent to the opening of the rack case.

3. An audio rack according to claim 1, wherein the linking mechanism comprises:
   - a first linking rod;
   - a first pin, by which one end of the first linking rod is rotatably linked to the rack case;
   - a second linking rod;
   - a second linking pin, by which one end of the second linking rod is rotatably linked to the other end of the first linking rod; and
   - a third linking pin, by which the other end of the second linking rod is rotatably linked to the operating unit.

4. An audio rack according to claim 1, further comprising an operating unit locking mechanism whereby the operating unit at the first position is releasably locked to the rack case.

5. An audio rack according to claim 4, wherein
   the operating unit locking mechanism has a mating part that is provided in the rack case and a resilient arm that extends from the operating unit,
   the resilient arm having a first protrusion, which freely mates with the mating part, whereby when the operating unit is in the first position, the first protrusion mates with the mating part, thereby preventing movement of the operating unit.

6. An audio rack according to claim 5, wherein
   the operating unit locking mechanism further has formed in it a through hole in the operating unit,
   the resilient arm further comprises a second protrusion that freely mates with the through hole, and
   when the operating unit is in the first and second position, the second protrusion is positioned within the through hole.

7. An audio rack according to claim 1, further comprising an equipment locking mechanism which releasably locks a piece of electrical equipment that is inserted into the rack case.

8. An audio rack according to claim 7, wherein
   the equipment locking mechanism comprises a pressure-operated member and a rotating member that is substantially C-shaped,
   the pressure-operated member being slidably supported so as to be able to move within the rack case between an unlocked position and a locked position,
   and the rotating member being rotatably supported by the rack case,
   one end of the rotating member being rotatably linked to the pressure-operated member, and wherein
   when one of the plurality of pieces of electrical equipment is inserted into the rack case, when the pressure-operated member is pressed so as to move it from the unlocked position to the locked position, the rotating member rotates and the other end of the rotating member mates with a mating part on the electrical equipment, and
   when the other end of the rotating member is mated to the mating part, if the electrical equipment is pulled out from the rack case, the mating part presses the other end of the rotating member, causing the rotating member to rotate, which releases the mating between the end of the rotating member and the mating part, thereby moving the pressure-operated member to the unlocked position.

* * * * *